Jan. 3, 1967  A. STEIN  3,295,867
APPLIANCE FOR COLLATED COPYMAKING OF NOTE-TAKING
IN BOOKS OR LOOSE-LEAF RECORDS
Filed Oct. 22, 1964  4 Sheets-Sheet 3

Jan. 3, 1967  A. STEIN  3,295,867
APPLIANCE FOR COLLATED COPYMAKING OF NOTE-TAKING
IN BOOKS OR LOOSE-LEAF RECORDS
Filed Oct. 22, 1964  4 Sheets—Sheet 4

United States Patent Office 3,295,867
Patented Jan. 3, 1967

3,295,867
APPLIANCE FOR COLLATED COPYMAKING OF NOTE-TAKING IN BOOKS OR LOOSE-LEAF RECORDS
Alexander Stein, 725 Royal Ave., Suite 101, New Westminster, British Columbia, Canada
Filed Oct. 22, 1964, Ser. No. 405,874
6 Claims. (Cl. 282—27)

This invention relates to a new type of appliance for collated copymaking of note taking in books and loose-leaf records alike: it is an improvement of my pending application No. 309,164, filed on Sept 16, 1963, titled, "Unified Recording Board and Record," and of my Canadian Patent No. 692,511 of the same title of August 11, 1964.

Starting point of my invention is that besides business administration there are a great many new fields where systematic note taking of data and the analysis of these data from different points of view became indispensable. To mention only a few: in modern research activities note taking of millions of observations and measurement are necessary; the higher level of education is connected with time consuming but indispensable note taking of teachers and millions of students, a.s.o.

Another starting point of my invention is the observation that note-taking is generally made without taking advantage of the process of simultaneous recordings, whereas they all serve for some kind of analysis that could be done faster and more easily through the collated copymaking process.

The objective and scope of my invention is to serve the progress through a new type of collating appliance adapted for the new requirements of these new fields of note taking.

The collating appliances of the prior art are strictly debit-credit bookkeeping devices, operable in standard offices by trained people; whereas in the new fields the note taking have to be made under a great variety of circumstances concerning time, location, individuals from young students to scientists, habits, purses and the type of data to be recorded from symbols to small drawings.

The requirements of such diversified use, inventors of the prior art even could not consider.

For such various kinds of requirements only such a type of collating appliance is suitable which is flexible to be easily used in different ways according to the purpose of note taking, which is utmost simple in handling for right and left-handed people alike and inexpensive.

My invention reveals that the use of carbon is the main hindrance of the prior art to be suitable for the diversified requirements of the new fields of note taking.

My invention overcomes this main hindrance eliminating the use of carbon; it applies chemically treated materials which produce the copies through the reaction between the applied chemicals and thus inscribing on the top sheet automatically reproduces copies on the subsequent sheets.

For certain purposes thin records have to be used for easy copymaking, however such records are awkward for handling and storing; my invention overcomes this hindrance applying for such purposes thin records thickened on the side or sides, thus creating records suitable for easy copymaking and for easy handling and storing alike.

My invention as described further on makes possible the necessary varieties of collated copymaking of note taking in books and loose-leaf records alike.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

The drawings show examples made in accordance with this invention:

FIGURES 1-6 show examples of note-taking assemblies for collated copymaking and FIGURES 7-8 of records having thickened parts for easy handling and storing of thin records.

The drawings are front views, partly broken away and in sections; the like reference characters indicate corresponding parts in all views.

Figure 1:
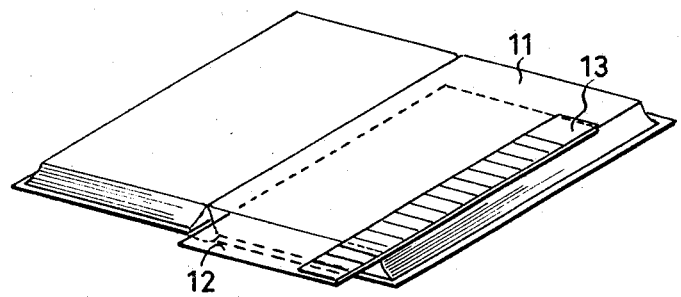
FIGURE 1 shows a page of a book, printing medium on the back; and a sheet, coating on the front and folded over the top.

FIGURE 1 shows one form of the embodiment of the invention, adapted to make without the use of carbon paper, collated copies on loose-leaf records of original recordings in books, the appliance comprising: for the original recordings a book comprising: pages of chemically treated paper with the printing medium on the underside 11; and for the collated copies loose-leaf records made of sheets of chemically treated paper with a coating on top 12, on which coating the copies of said original recordings made on the pages 11 appear, said sheets 12 being over the top folded on one side to form a guide portion 13, said guide portion being calibrated for marking the used plate and adapted to slidingly engage the edge of a page of said book.

Figure 2:
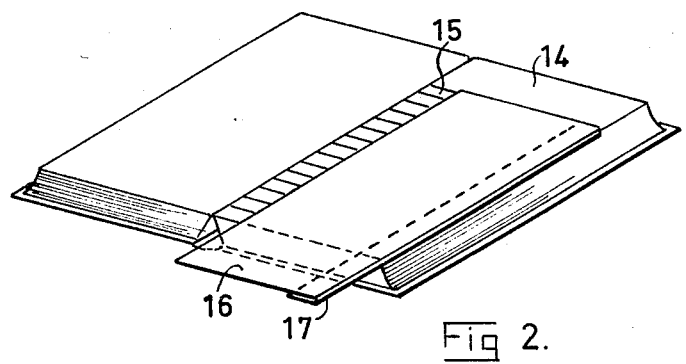
FIGURE 2 shows a page of a book, coating on the front; and a sheet, printing medium on the back and folded under the bottom.

FIGURE 2 shows one form of the embodiment of the invention, adapted to make without the use of carbon paper collated copies in a book of original recordings on loose-leaf records, the appliance comprising: for the original recordings loose-leaf records made of sheets of chemically treated paper with the printing medium on the underside 16, said sheets being under the bottom folded on one side to form a guide portion 17, adapted to slidingly engage the edge of a page of a book; for the collated copies said block comprising pages of chemically treated paper with coating on top 14, on which coating the copies of said original recordings made on sheet 16 appear, said pages of the book being calibrated 15 for marking the used place.

Figure 3:
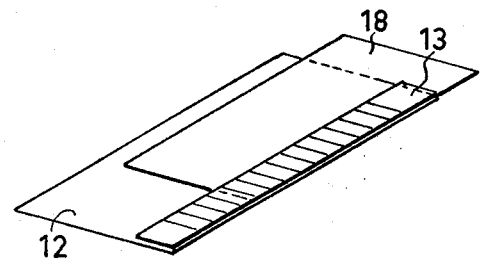
FIGURE 3 shows a sheet, coating on the front, and folded over the top; and a loose-leaf sheet, printing medium on the back.

FIGURE 3 shows one form of the embodiment of the invention, adapted to make without the use of carbon collated copies on folded loose-leaf records, the appliance comprising: for the original recordings loose-leaf records made of chemically treated paper with the printing medium on the underside 18; and for the collated copies sheets of chemically treated paper with a coating on top 12, on which coating the copies of said original recordings made on sheet 18 appear, said sheets 12 being over the top folded on one side to form a guide portion 13, said guide portion being calibrated for marking the used place and adapted to slidingly engage the edge of said loose-leaf records 18 of the original recordings.

Figure 4:
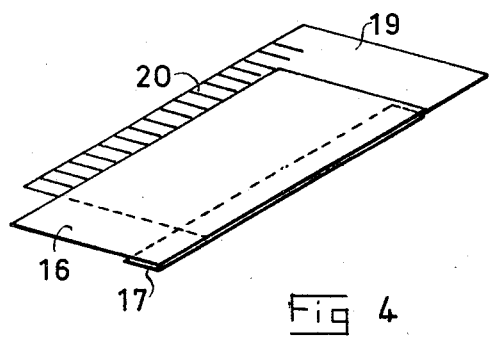
FIGURE 4 shows a sheet, printing medium on the back and folded under the bottom; and a loose-leaf sheet, coating on the front.

FIGURE 4 shows one form of the embodiment of the invention adapted to make without the use of carbon paper collated copies on loose-leaf records, of original recordings on folded loose-leaf records, the appliance comprising: for the original recordings sheets of chemically treated paper with the printing medium on the underside 16, said sheets being on one side under the bottom folded to form a guide portion 17, adapted to slidingly engage the edges of loose-leaf records; for the collated copies loose-leaf records being made of chemically treated paper with coating on top 19, on which coating the copies of the original recordings appear, said loose-leaf records being calibrated on the edges 20 for marking the used place.

Figure 5:
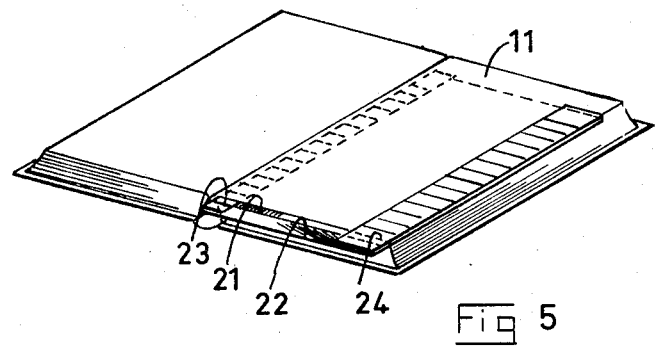
FIGURE 5 shows a page of a book, printing medium on the back; and a loose-leaf sheet, coating on the front and printing medium on the back; further a sheet, coating on the front and folded on both sides over the top.

FIGURE 5 shows another form of the embodiment of the invention, adapted to make without the use of carbon paper collated copies on two records of original recordings in a book, the appliance comprising: for the original recordings a book comprising pages of chemically treated paper with the printing medium on the underside 11; for the first collated copies loose-leaf records 21 made of chemically treated paper with a coating on top, on which coating the copies of the original recordings made on page 11 appear and with the printing medium on the underside; for the second collated copies sheets of chemically treated paper 22 with the coating on top, on which through the printing medium of the loose-leaf records 21 the copies of the original recordings appear, said sheets 22 being over the top folded on both sides 23, 24 to form on both sides guide portions, calibrated for marking the used place and adapted to slidingly engage in one guide portion the edge of said loose-leaf records 21 on which the first copies appear and in the other guide portion 24 the edge of a page of said book 11 of the original recordings.

Figure 6:
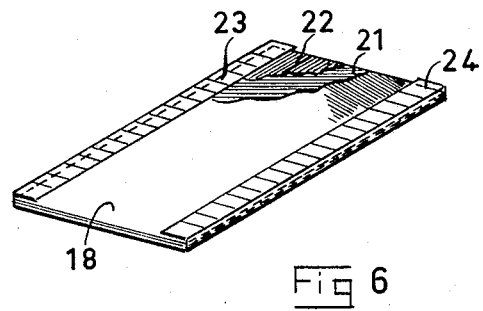
FIGURE 6 shows a loose-leaf sheet, printing medium on the back; a loose-leaf sheet, coating on the front and printing medium on the back; further a sheet, coating on the front and folded on both sides over the top.

FIGURE 6 shows one form of the embodiment of the invention, adapted to make without the use of carbon paper, collated copies on two records of original recordings on loose-leaf records, the appliance comprising: for the original recordings loose-leaf records made of chemically treated paper with the printing medium on the underside 18; for the first collated copies loose-leaf records made of chemically treated paper 21 with coating on top, on which the copies of the original recordings made on loose-leaf record 18 appear and with a printing medium on the underside; for the second collated copies sheets of chemically treated paper 22, on the top a coating on which through the printing medium on the underside of the loose-leaf record 21 the second copies of the original recordings appear, said sheets 22 being over the top folded on both sides to form on both sides guide portions 23, 24, said guide portions being calibrated for marking the used place, and one of the guide portions 23 adapted to slidingly engage the edge of the loose-leaf records with the coating on top and the printing medium on the underside 21, and the other guide portion 24 adapted to slidingly engage the edge of the loose-leaf records 18 with the printing medium on the underside.

Figure 7:
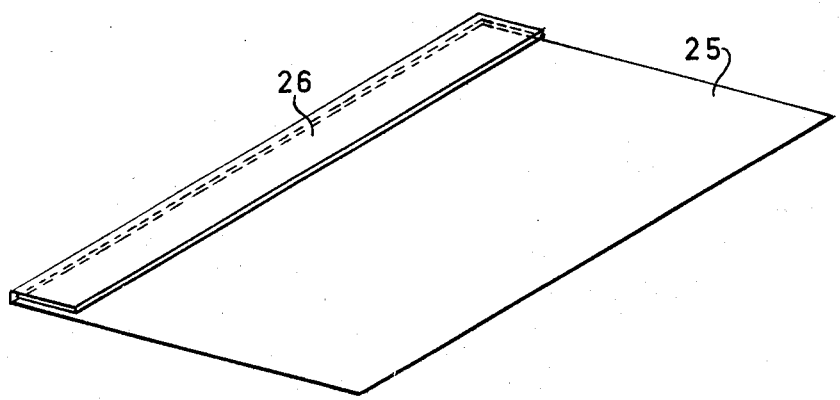
FIGURE 7 shows a sheet, with or without coating on the front and with or without printing medium on the back, thickened on one side.

FIGURE 7 shows a variation of the applied sheets, adapted for easy copymaking and convenient handling and storing alike: a small part of the sheet 25 being thickened by folding it on one side 26 or thickened by covering it with small layers of material; said small part pressed, stitched or adhered with glue or the like.

Figure 8:
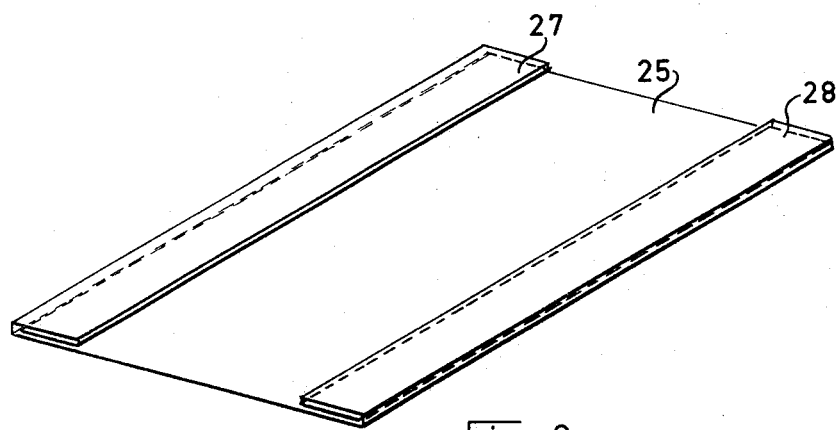
FIGURE 8 shows the same, thickened on both sides.

FIGURE 8 shows the same embodiment of this part of the invention as outlined in the description of FIGURE 7, however a small part of the sheet 25 being folded on both sides 27, 28 or covered with small layers of material; said small parts being pressed, stitched or adhered with glue or the like.

All changes and modifications within the spirit of my invention are included in the scope of the following claims.

The embodiments of the invention in which an exclusive property or privilege is claimed are defined as follows:

1. A note taking appliance to make collated copies on loose-leaf records from original recordings in books, and the process of use comprising; a book made of leaves of chemically treated paper on the underside with the transfer medium and the top for original recordings; and collated copy sheets of chemically treated paper with a coating on top, onto which coating face to face with the transfer medium of a leaf of said book copies of the original recordings are transferred; said copy sheets being folded over the top on both sides to form guide portions according to right or left handed use one of said guide portions to indicate the place used and to slidingly engage the edge of leaves of said book.

2. A note taking appliance to make collated copies in a book from original recordings on loose-leaf records, and the process of use comprising; record sheets made of chemically treated paper, on the underside with the transfer medium and the top for the original recordings; and a book made of leaves of chemically treated paper with a coating on top, onto which coating face to face with the transfer medium on the underside of one of said record sheets copies of the original recordings are transferred; said record sheets being folded under the bottom on both sides to form guide portions according to right or lefthanded use one of said guide portions to indicate the place used and to slidingly engage the edge of leaves of said book.

3. A note taking appliance to make two independently collated copies from original recordings in books, and the process of use comprising; a book made of leaves of chemically treated paper, on the underside with the transfer medium and the top for the original recordings; and collated first copy sheets of chemically treated paper with a coating on the top and with the transfer medium on the underside; and collated second copy sheets of chemically treated paper with a coating on top; onto the coatings of said first and second copy sheets, the top of the first copy sheet face to face with the transfer medium of a leaf of said book and the top of the second copy sheet face to face with the transfer medium of the first copy sheet, copies of the original recordings are transferred; said second copy sheet being folded over the top on both sides to form on both sides guide portions, one guide portion to indicate the place used and to slidingly engage the edge of a leaf of said book, one to slidingly engage the edge of a first copy sheet.

4. A note taking appliance to make two independently collated copies from original recordings on loose-leaf records, and the process of use comprising; loose-leaf records of chemically treated paper, on the underside with the transfer medium and the top for the original note taking; and collated first copy sheets of chemically treated paper with a coating on top and with the transfer medium on the underside; and collated second copy sheets of chemically treated paper with a coating on top; onto the coatings of said first and second copy sheets, the top of a first copy sheet face to face with the transfer medium of a loose-leaf record for the original note taking and the top of a second copy sheet face to face with the transfer medium on the underside of a first copy sheet, copies of the original recordings are transferred; said second copy sheet being folded over the top on both sides to form on both sides guide portions, one guide portion to indicate the place used and to slidingly engage the edge of a loose-leaf record for the original note taking, one to slidingly engage the edge of a first copy sheet.

5. Loose-leaf records as specified in claim 4, made of thin chemically treated papers inapt for repeated manipulation and adapted for easy transfer of original recordings in the copy making process; thickened on the sides and adapted for repeated handling and storing and the easy transfer of original recordings alike.

6. A note taking appliance to make collated copies and the process of use, comprising; a set of sheets made of chemically treated flexible material as paper with the coating on top and the transfer medium on back, the sheets being folded on both sides forming on both sides guide portions on which the used place is indicated and in which edges of sheets, the tops of the sheets facing the backs of the sheets, are slidingly aligned; the original recordings being transferred from the top of any of the sheets of the set to the top of any other sheet of the set.

References Cited by the Examiner

UNITED STATES PATENTS

| | | | |
|---|---|---|---|
| 861,228 | 7/1907 | Turck | 282—8 |
| 2,590,259 | 3/1952 | Maass | 282—27 |
| 2,718,413 | 9/1955 | Fransson et al. | 282—8 |
| 2,886,345 | 5/1959 | Du Brul | 282—27 |

FOREIGN PATENTS

| | | |
|---|---|---|
| 870,914 | 1/1942 | France. |
| 861,568 | 1/1953 | Germany. |

LAWRENCE CHARLES, *Primary Examiner.*